L. H. SMITH.
CLOD CRUSHER.
APPLICATION FILED MAY 9, 1908.
907,903.
Patented Dec. 29, 1908.
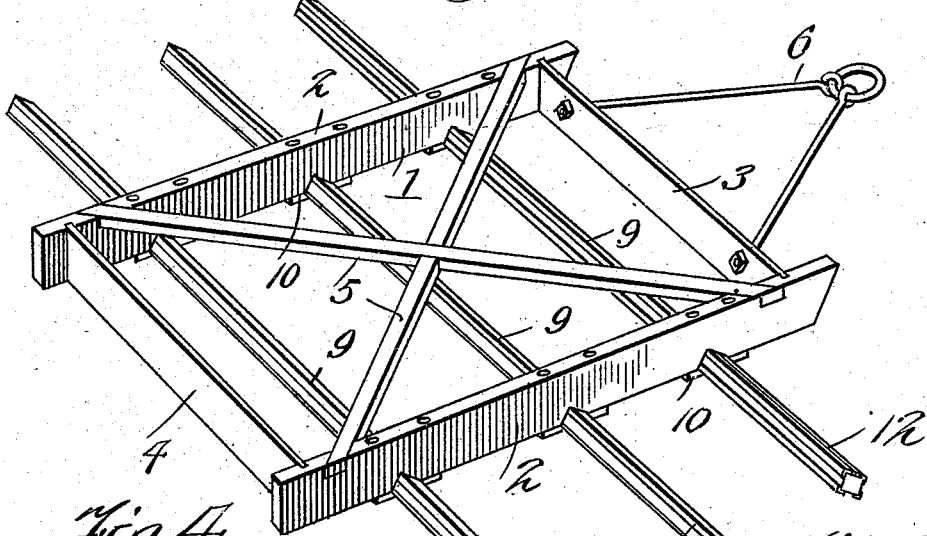
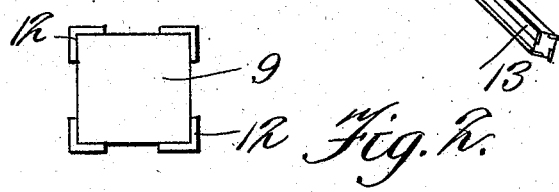
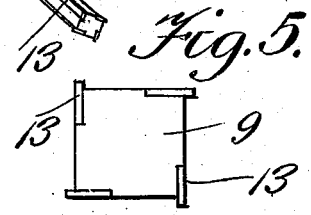
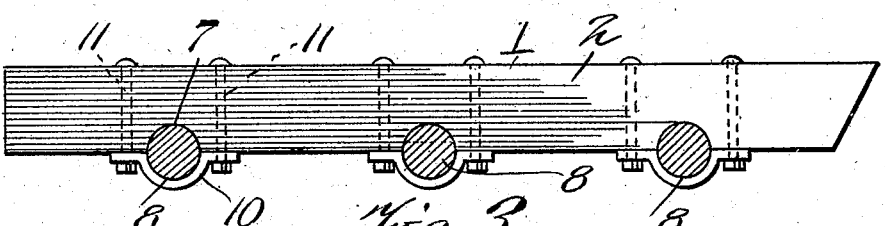
Inventor
Leander H. Smith
Witnesses
By Victor J. Evans
Attorney

UNITED STATES PATENT OFFICE.

LEANDER H. SMITH, OF KILLBUCK, OHIO.

CLOD-CRUSHER.

No. 907,903.  Specification of Letters Patent.  Patented Dec. 29, 1908.

Application filed May 9, 1908. Serial No. 431,795.

*To all whom it may concern:*

Be it known that I, LEANDER H. SMITH, a citizen of the United States, residing at Killbuck, in the county of Holmes and State of Ohio, have invented new and useful Improvements in Clod-Crushers, of which the following is a specification.

This invention relates to improvements in clod crushers or ground breaking harrows of that type comprising a drag frame provided with pulverizing rolls, the object of the invention being to provide a simple and inexpensive construction of implement of this character having an improved construction and arrangement of angular pulverizing rolls, whereby, in the operation of drawing the implement over the surface of a broken field or plot of ground, the clods will be thoroughly broken and reduced to a pulverized condition, leaving the earth in a loose and comminuted state.

The invention consists of the features of construction, combination and arrangement of parts hereinafter fully described and claimed, reference being had to the accompanying drawing, in which:—

Figure 1 is a perspective view of a clod crusher embodying my invention. Fig. 2 is a side elevational view thereof with the crushing rolls shown in transverse sections on a line through their cylindrical journals. Fig. 3 is a perspective view of a portion of one of the pulverizing rolls. Fig. 4 is an end elevation of the front roll. Fig. 5 is a similar view of one of the other rolls.

Referring to the drawing, the numeral 1 designates the frame of the implement, which is in the form of a drag frame preferably of oblong rectangular form, and comprises a pair of longitudinal side bars 2, connected by front and rear cross bars 3 and 4 and cross braces 5. A suitable type of draft coupling 6 is applied to the front cross bar 3 for the attachment of the draft animal or animals.

The side bars 2 are provided in their lower faces at regular intervals apart with semicircular bearing recesses 7 in which turn the cylindrical portions 8 of a series of angular crushing rolls 9. These rolls may be square or of any other suitable angular form in cross-section and are of greater length than the width of the frame so as to extend between the side bars and project beyond the same. The journals 8 are retained in engagement with the recesses 7 by bearing irons or clips 10 secured to the bars by bolts 11. In the present instance I have shown the use of three angular breaking rolls, but any number of such rolls, arranged one in rear of the other, may be employed.

In the operation of the device, it will be understood that the draft animal or animals are attached to the draft connection 6 and the implement drawn across the broken field or plot of ground, the rolls 9 being rotated by contact with the ground surface. In the rotation of each roll, the angular and flat faces thereof alternately come into action to raise and depress the drag frame and to cut through and crush the clods of earth, the corner angles cutting through the clods while the flat faces bear upon and crush the particles thereof. As the corner angle of each roll reaches the lowest position in its course of rotation, it not only cuts through the soil but elevates the drag frame, so that when the next adjacent flat face in the direction of rotation of said roll comes in contact with the soil, it will allow the frame to drop, whereby the weight of the frame is utilized in the crushing action. This combined cutting and crushing action of the angular rolls results in all the clods and large and hard particles of the earth being broken and reduced to a loose and comminuted condition, with obvious advantages in the planting of the seed and the retention of moisture and the consequent growth of crops. As the bearings of the rolls are disposed at some distance apart, freedom of motion of the rolls is insured, as any tendency of the rolls to bind in their bearings is avoided.

In order to protect the corners of the rolls from wear or breakage and to increase their crushing action on the soil, each roll is provided at each of its corner portions with a combined wear and breaking strip. The front roll, as shown in Fig. 4, is provided at each of its corner portions with an L-shaped or channeled breaking strip 12, the flanges of which lap over upon the sides thereof, while the intermediate and last roll of the series are recessed in their sides adjacent their corner edges to receive metallic strips 13, which project beyond the faces of the roll to provide breaking extensions.

It will be seen that the invention provides an effective implement for the purpose described which possesses the additional advantage of being simple of construction and susceptible of being manufactured at a low cost.

Having thus fully described the invention, what is claimed as new is:—

A clod crusher and pulverizer comprising a frame embodying side bars, front and rear cross bars, and crossed braces connecting the front and rear ends of said side bars and intermediately connected with each other at the crossing point, each of said side bars being formed in its lower edge with a series of bearing recesses, a series of transverse crushing and pulverizing rollers, each consisting of a bar having intermediate and end portions of angular form with their faces unbroken and arranged at an angle of 90° to each other, the intermediate portions of the rollers extending between the side bars and the end portions of said rollers beyond said side bars, and said intermediate and end portions of the respective rollers being connected by reduced portions of cylindrical form providing journals fitting in said bearing recesses, the adjacent ends of the intermediate and end portions of each roller constituting stop shoulders engaging the side bars to prevent endwise movement of the rollers, and detachable bearing plates arranged upon the lower faces of the side bars and having flattened ends secured to said bars and partially circular body portions disposed opposite said recesses and coacting therewith to form bearings for the journals of the rollers, substantially as described.

In testimony whereof I affix my signature in the presence of two witnesses.

LEANDER H. SMITH.

Attested by—
C. C. THOMPSON,
S. H. WHISLER.